United States Patent
Räpke et al.

(10) Patent No.: US 7,637,281 B2
(45) Date of Patent: Dec. 29, 2009

(54) PILOT CONTROLLED PULSE VALVE

(75) Inventors: Falk Räpke, Ostfildern (DE); Grzegorz Bogdanowicz, Ostfildern (DE)

(73) Assignee: Festo AG & Co. KG, Esslingen (DE)

( * ) Notice: Subject to any disclaimer, the term of this patent is extended or adjusted under 35 U.S.C. 154(b) by 713 days.

(21) Appl. No.: 11/503,100

(22) Filed: Aug. 11, 2006

(65) Prior Publication Data

US 2007/0044857 A1    Mar. 1, 2007

(30) Foreign Application Priority Data

Aug. 31, 2005    (EP) .................................. 05018855

(51) Int. Cl.
*F15B 13/01*    (2006.01)
*F16K 11/065*    (2006.01)
*F16K 31/124*    (2006.01)

(52) U.S. Cl. ............................ 137/625.64; 137/625.66; 251/31; 251/65

(58) Field of Classification Search ............ 137/625.64, 137/625.66; 251/31, 65; 335/229, 253, 274
See application file for complete search history.

(56) References Cited

U.S. PATENT DOCUMENTS

| | | | |
|---|---|---|---|
| 2,967,545 A * | 1/1961 | Schmidt | ...................... 335/253 |
| 3,203,439 A * | 8/1965 | Beckett | ........................ 251/65 |
| 3,304,126 A | 2/1967 | Rupp et al. | |
| 3,326,236 A | 6/1967 | Beckett et al. | |
| 3,465,686 A | 9/1969 | Nugier | |
| 3,592,230 A * | 7/1971 | Piroutek | ................ 137/625.66 |
| 3,794,075 A | 2/1974 | Stoll et al. | |
| 3,847,371 A * | 11/1974 | Norton et al. | .................. 251/65 |
| 3,881,505 A * | 5/1975 | Dunkelis | ............... 137/625.66 |
| 4,203,571 A | 5/1980 | Ruchser | |
| 4,310,143 A * | 1/1982 | Determan | .............. 137/625.64 |
| 5,174,731 A | 12/1992 | Korver | |
| 5,377,719 A * | 1/1995 | Gyllinder et al. | ....... 137/625.66 |
| 5,666,994 A | 9/1997 | Stoll et al. | |

FOREIGN PATENT DOCUMENTS

| | | |
|---|---|---|
| DE | 24 22 593 | 11/1975 |
| DE | 196 36781 | 3/1998 |
| EP | 0 650 002 | 6/1997 |

OTHER PUBLICATIONS

"Bauelmenter der Pneumatik," published by Otto Krausskopf Verlag GmbH, Mainz, 1972, pp. 259-261.

* cited by examiner

*Primary Examiner*—John Rivell
(74) *Attorney, Agent, or Firm*—Hoffman & Baron, LLP

(57) ABSTRACT

A pilot controlled pulse valve has a valve spool releasably held in both terminal positions by a latching device. The latching device comprise a permanent magnet holding the valve spool by magnetic force. To set the terminal or end position the permanent magnet has an abutment placed to the fore of it. In order to protect the permanent magnet against damage the abutment bears against the valve housing independently of the permanent magnet.

24 Claims, 1 Drawing Sheet

PILOT CONTROLLED PULSE VALVE

BACKGROUND OF THE INVENTION

The invention relates to a pilot controlled pulse valve comprising a principal valve which is able to be fluid actuated by a pilot valve means and which possesses a valve spool able to be switched over between two terminal positions by pulsed fluid actuation in a valve housing, at least one axial terminal portion of the valve spool possessing holding means for releasable housing-related latching of the valve spool when in a terminal position and not axially fluid-actuated.

Pulse valves are multiway valves, whose valve spools are actuated by a fluid control pressure in a pulsed manner for switching over between two terminal positions, the valve spool maintaining its terminal position even after termination of the control pressure. Such valves exhibit the advantage that the switching positions of the valve spool may be maintained for a practically unlimited time without the constant supply of energy. In order to ensure that the valve spool dwells in the respective terminal position even when subjected to vibrations additional latching means are however needed which provide for a releasable housing-related locking of the valve spool.

THE PRIOR ART

In the case of a one pulse valve of this type as described in the textbook "Bauelemente der Pneumatik", published by Otto Krausskopf Verlag GmbH, Mainz, 1972, pages 259 through 261 seals arranged on the valve spool function as latching means by cooperation with the valve housing, such latching means holding the valve spool in place owing to the mechanical friction occurring. Since the seals are subject to wear in the course of time such latching in the terminal position can not be ensured permanently. Alternatively it would also be possible to employ latching means designed as detent means in the case of which however there would also be a wear problem.

In conjunction with directly actuated solenoid valves it is already known to set a valve member in one of two positions, between which it is able to be shifted by magnetic force. The European patent publication 0 650 002 B1 describes a solenoid valve for this, whose moving armature on reaching a terminal position contacts an iron core which at the rear bears against a permanent magnet fixed to the housing. Since accordingly the terminal impact of the valve member directly acts on the permanent magnet, such an arrangement is not appropriate for use in pulse valves, since in this case the valve spool must be displaced a fair distance between its two terminal positions and therefore on arriving in the terminal position has a large amount of kinetic energy, something which could damage the permanent magnet.

The same applies for the directly actuated spool valve of the German patent publication De 196 36 781 C2. Here as well the permanent magnet is preceded by a body consisting of ferromagnetic material, against which the valve member strikes and which bears against the housing by way of a permanent magnet thereon. Moreover, as in the case of the said European patent publication 0 650 002 B1 the magnetic holding force may only be influenced by the employment of permanent magnet means of different strength, something rendering it a relatively complex task to provide spool valves with different actuating forces, since it is necessary to have recourse to different permanent magnet means.

SHORT SUMMARY OF THE INVENTION

One object of the present invention is to provide measures in a pilot controlled pulse valve ensuring a low-wear fixation of the valve spool in the respective terminal position and furthermore able be put into practice at low costs.

In order to achieve these and/or other objects appearing from the present specification, claims and drawings, in the present invention in the case of a pulse valve of the type initially mentioned the latching means include a permanent magnet means arranged in a fixed manner in relation to the housing and in an axial extension of the valve spool and adapted to retain the valve spool, when same has assumed the associated terminal position, by magnetic force, the valve spool in this position being arranged at an axial distance, not bridged over by ferromagnetic material, from the permanent magnet means, such distance being set by an abutment means, which is axially arranged between the permanent magnet means and the valve spool to cooperate with the facing end side of the valve spool, such abutment means being supported in relation to the housing in a manner independently of the permanent magnet means.

The principle of functioning of the latching means in accordance with the invention based on magnetic force renders possible minimized wear operation and ensures a long service life of the pulse valve without any substantial reduction in the latching forces. The impact of the valve spool on reaching its terminal position is absorbed by an abutment means independent of the permanent magnet means and is imparted to the valve housing bypassing the permanent magnet means so that the permanent magnet means is hardly subjected to any mechanical load and accordingly a risk of being damaged or crushed. Since the axial intermediate space, present in the terminal position between the valve spool and the permanent magnet means, is free of ferromagnetic material, by way of the change in the axial distance apart the magnetic latching forces acting on the valve spool may be influenced, more particularly taking into account the control pressure acting during operation on the valve spool. It is therefore possible, if necessary using one and the same permanent magnet means to produce different levels of magnetic latching forces in accordance with the type of valve by changing the said axial distance apart.

Further advantageous developments of the invention are defined in the claims.

The abutment means could for example comprise one or more projections, which extend with an axial clearance from the permanent magnet means radially into the path of displacement of the valve spool. It is however expedient for the entire axial clearance between the permanent magnet means and the valve spool in the terminal position to be bridged over by the abutment means. The latter preferably consists of non-ferromagnetic material, a plastic design being preferred.

In order to attain the desired magnetic force of attraction the valve spool can completely (or at least in its terminal section adjacent to the permanent magnet means) consist of ferromagnetic material or more especially non-permanently magnetic material. As an alternative it would be possible as well to employ a valve spool of non-ferromagnetic material, which at its terminal section adjacent to the permanent magnet means bears at least one piece of material having ferromagnetic and more especially non-permanently magnetic properties.

A short of overall length of the pulse valve combined with a high magnetic latching force may also be expected, when the permanent magnet means is disk-like in shape and is arranged coaxially to the valve spool. Preferably it will consist of a single permanently magnetic component, as for example a permanently magnetic disk member.

A particularly simple form of assembly and fitting of the permanent magnet means is possible if it is accommodated in a accommodating space which is delimited between the end terminal wall, fixed in relation to the housing, of the valve spool socket and a pot-shaped body inserted in the valve spool socket. The floor of the pot-shaped body simultaneously constitutes the abutment means in this case. By way of the terminal face, bearing against the terminal wall, of the peripheral wall of the pot-shaped body the impact forces imparted by the valve spool are taken up by the valve housing while circumventing the permanent magnet means.

The pot-shaped body may be a component of a more particularly substantially sleeve-like spacer element, which in the axially opposite direction produces a supporting action by cooperating with a seal means which is in particular sleeve-like and surrounds the valve spool. In this respect it is preferably a question of a support wall extending from the floor toward the valve spool and against which the seal means rests.

The pot-shaped pot-shaped body and possibly the support element consist more particularly completely of plastic material.

It is accordingly possible to provide several such components, which differ from each other by the thickness of the floor functioning as the abutment means and which may be inserted in accordance with the particular case for the adaptive assembly of a pulse valve in manner dependent on the respectively desired latching force.

In order to exclude the possibility of axial loading of the permanent magnet means despite manufacturing inaccuracies the permanent magnet means is preferably held in place with axial play between the abutment means and the terminal wall on the housing axially opposite the abutment means.

For switching over the principal valve a control chamber placed axially to the fore of the valve spool within the valve spool socket may be supplied with a drive fluid at the desired control pressure. The supply to and removal of the drive fluid from the control chamber takes place in this case preferably via a pilot control duct extending through the abutment means and the permanent magnet means. The corresponding end or terminal section of the pilot control duct will more particularly extend centrally in relation to the valve spool socket with a coaxial alignment with reference to it.

Further advantageous developments and convenient forms of the invention will be understood from the following detailed descriptive disclosure of one embodiment thereof in conjunction with the accompanying drawing.

DETAILED ACCOUNT OF WORKING EMBODIMENT OF THE INVENTION

Figure 1:
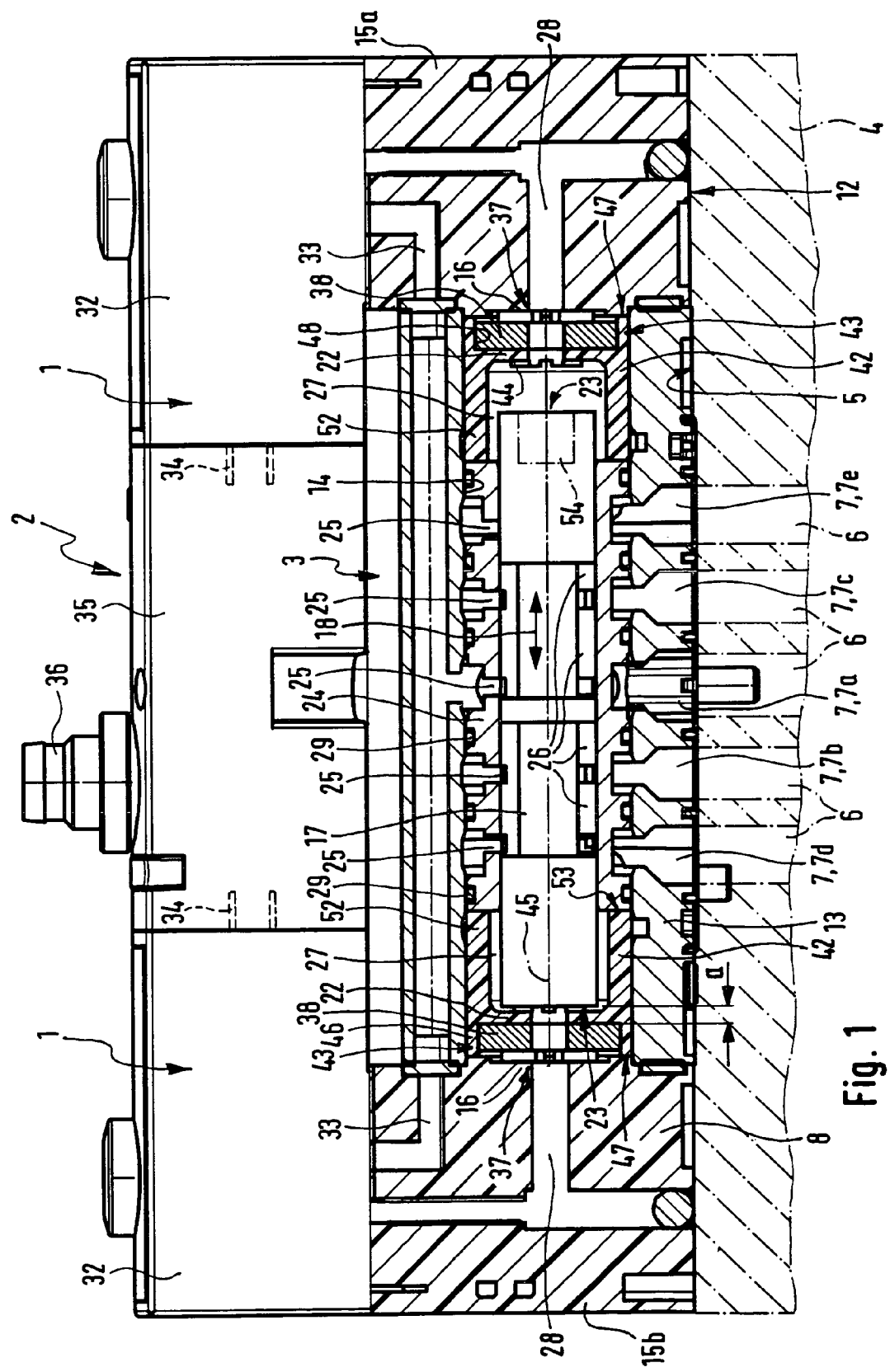
FIG. 1 shows a preferred embodiment of the pilot control valve in a partial longitudinal representation, chained lines being employed to indicate a base plate, whereon the pulse valve may be mounted.

The drawing shows a pulse valve 2 which is pilot controlled by means of an electrically actuated pilot control means 1, comprising a principal fluid operated valve 3 by way of the pilot valve means 1, such principal valve 3 being assembled together with the pilot valve means 1 in the form of a uniformly handled sub-assembly.

The pulse valve 2 is mounted on a base plate 4 indicated in chained lines. At the corresponding component mounting face 5 of the base plate 4 base plate ducts 6 open, which communicate with flush valve ducts 7 extending in the valve housing 8 of the principal valve 3 and open opposite to the base plate ducts 6 at the mounting face 12, of the valve housing 8.

The valve housing 8 of the working example comprises an elongated middle part 13, which exhibits a cavity extending through in the longitudinal direction and which serves as a valve spool socket 14. At the end on either side of the middle part 13 a respective terminal part 15a and 15b is mounted in a sealing fashion, which constitutes a terminal wall 16 closing off the valve spool socket 14 at its ends.

Coaxially in the valve spool socket 14 a preferably piston-shaped valve spool 17 is accommodated. It can be switched over in the direction of its longitudinal axis performing a switching over movement 18 indicated by a double arrow between two end positions, of which one is visible in the drawing.

Both terminal positions are defined by an abutment means 22 also placed in the valve spool socket 14. Each of the two end faces 23, facing in opposite axial directions, of the valve spool 17 is axially preceded in the movement direction by such an abutment means 22, which is fixed in relation to the housing. The valve spool 17 reaches an end position when its one of its end faces 23 engages the facing abutment means 22. The opposite end face 23 is then at a distance, equal to the switching displacement, from the abutment means 22 associated with it.

A seal means 24 coaxially surrounding the valve spool 17 divides up the valve spool socket 14 axially into several control sections 25 communicating with one respective one of the valve ducts 7. The control sections 25 are axially spaced apart and separated from each other by seal sections 26, same being characterized by having a smooth circularly cylindrical peripheral face.

The valve spool 17 is multiply stepped in the longitudinal direction and possesses alternatingly arranged longitudinal sections with a respectively larger and smaller diameter. Should a longitudinal section with a large diameter assume a position in a seal section 26, it will constitute a partition between the two adjacent control sections 25 and prevent transfer of fluid. On the other hand flow transfer may take place between control sections 25, which lie in a length section with a smaller diameter. Accordingly, dependent on the position of the valve spool 17, there will be different fluid circuit arrangements between the valve ducts 7.

The pulse valve of the working example is conceived of as a 5/2 multiway valve, respectively one valve duct, designed as a supply duct 7a, being connected with one of two axially adjacent power ducts 7a and 7b, respectively, whereas simultaneously the respective power duct, not connected with the supply duct 7a, is connected to the adjacent one of two axially far apart venting ducts 7d and 7e, respectively. However, other valve functionalities would be possible.

The sealing cooperation between the seal means 24 and the valve spool 17 takes place without soft seals. Both components consist at least in the contact zones of a hard material and are to slide against each other freely. The necessary sealing action is ensured by the precise fitting of the valve spool 17 in the seal means 24. The seal means 24 itself engages the peripheral face of the valve spool socket 14 in a sealing manner by means of surrounding seals 29 with a static action.

The valve spool 17 is switched over by brief fluid actuation from the one terminal position into the other terminal position. The power fluid necessary for this at a sufficiently high control pressure takes effect on the one or the other of the two terminal faces 23 dependent on the desired direction of switching over.

For this purpose the two axial terminal sections of the valve spool socket 14 are in the form of chambers 27 into which a respectively associated terminal section of the valve spool plunges. By way of a pilot control duct 28 extending through the adjacent terminal part 15a and 15b respectively the control chamber 27 in question is connected respectively with a pilot control valve 32, mounted on the principal valve 3, of the pilot valve means 1. Each pilot control valve 32 is furthermore connected by way of pilot control supply ducts 33 with a fluid control pressure source, a separate fluid supply being possible or, as in the working example, a tapping duct from the supply duct 7a of the principal valve 3 may be used.

The two pilot valves 32 are 3/2 multiway valves and communicate additionally in each case with a venting duct, not illustrated in detail. Dependent on the switching position of a pilot control valve 32 the control chamber 27, which is connected therewith, is accordingly supplied with a drive fluid at the control pressure or is vented to the atmosphere.

The pilot valves 32 are designed for electrical operation. Connection contacts are indicated at 34, by way of which electrical actuating signals for actuation are applied at 34. It is a question with the pilot control valves 32 in particular of solenoid valves, although other designs could be utilized, for example piezoelectric valve or electrostatically operated micro-valves.

In the working embodiment the connection contacts 34 are electrically connected with electronic circuitry 35 located on board the pulse valve 2, such circuitry having an electrical interface 36, which renders possible connection with a master electronic control means. The actuating signals could however also be supplied directly from the outside; the pulse valve 2 itself does not directly require integrated control circuitry 35.

The character of the pulse valve is expressed by the fact that the valve spool 17 only has to be actuated for the purpose of switching over between the terminal or end positions by a control pressure. Once an end position is reached, the valve spool will dwell in the corresponding position even if the control pressure applied in this position is discontinued. The valve spool 17 accordingly dwells in the respectively selected terminal position without the constant supply of energy.

In order to ensure that its state of being arrested is maintained even in the case of heavy mechanical loads on the valve 2, as for example in the case of a swing shock load, each of the two axial terminal portions of the valve spool 17 is provided with latching means 37, which lock the valve spool 17 in the terminal position in a releasable manner in relation to the housing. The latching force then obtained is however less than the setting force, which may be exerted by the drive fluid during a corresponding control action of a pilot control valve 32 in the opposite direction on the end face 23 of the valve spool 17. Accordingly the desired switching function is ensured notwithstanding the latching function in the terminal position.

The latching means 37 provided for the two terminal or end sections of the valve spool 17 are in the working example identical in design so that the following description applies for both of them. It would however readily be possible to have a valve design in which the two terminal portions of the valve spool 17 are furnished with differently designed latching means or in the case of which such latching means are located only at one terminal portion of the valve spool 17.

The latching means 37 comprise a permanent magnet means 38 arranged in a fixed manner in relation to the housing as an axial extension of the valve spool 17. It latches the valve spool 17 on assuming the associated terminal position by magnetic force. The associated terminal position is, as mentioned, to the fore, when the valve spool 17 has hit the above mentioned abutment means 22. This abutment means 22 is located respectively axially between the valve spool 17 and the associated permanent magnet means 38.

The arrangement is so designed that the valve spool 27, when it reaches a terminal position is at an axial distance "a" in front or short of the permanent magnet means 38. In the intermediate space, defined by this axial distance "a", there is preferably no ferromagnetic material so that the magnetic field between the permanent magnet means 38 and the valve spool 17 is not specially conducted or amplified and therefore the attraction forces obtaining between the two components are dependent substantially on the size of the above mentioned axial distance "a".

Accordingly by the selection of a suitable axial distance "a" it is possible to take the control pressure into account, using which the valve spool 17 is acted upon for the purpose of switching it over. The lower such control pressure and consequently furthermore the setting force entailed by it, the smaller the magnetic latching forces may be in order to ensure the switching over function. Accordingly in conjunction with large setting forces a relatively small axial distance "a" may be selected for the sake of getting a substantial latching force.

The advantage of this design is that on the basis of one and the same type of permanent magnet means 38 different control pressures may be catered for simply by having different distances between the valve spool 17 in the terminal position and the associated permanent magnet means 38.

A further advantage of the latching means 37 results from the fact that the abutment means 22 is supported, in a manner independent of the permanent magnet means 38 provided for it, axially in relation to the housing. The forces acting when on the valve spool 17 hits abutment means 22 in the end position are accordingly not transferred to the permanent magnet means 38 but rather, circumventing same, directly to the valve housing 8. Even in the case of a heavy impact damage or complete destruction of the permanent magnet means 38 is therefore out of the question.

In the preferred working embodiment illustrated the latching means 37 comprise an essentially sleeve-like and preferably integral support element 42, which is fitted in the associated terminal section of the valve spool socket 14. It has a circularly cylindrical outline matching the also circularly cylindrical inner periphery of the valve spool socket 14.

One such support element 42 is placed axially between the seal means 24 and the adjacent terminal wall 16. It bears axially against the two components simultaneously and accordingly ensures an axially fixed positioning of the seal means 24 in relation to the valve housing 8.

A terminal or end component of the support element 42 is constituted by a pot-shaped body 43. Its floor 44 extending at a right angle to the longitudinal axis 45 of the valve spool socket 14 is located between the valve spool 17 and the permanent magnet means 38 and constitutes the abutment means 22.

The pot-shaped body 43 is so orientated that its opening faces the terminal wall 16 and hence the permanent magnet means 38 placed to the fore of it as well. In this case the permanent magnet means 38 will assume a position within the pot-shaped body 43 and will be surrounded by the peripheral wall 46 of the pot-shaped body 43, which has its annular terminal face 47 bearing in an axial direction against the terminal wall 16. Accordingly the permanent magnet means 38 will assume a position in the accommodating space 48 defined between the pot-shaped body 43 and the terminal wall 16 on the housing.

For a supporting cooperation with the seal means 24 the support element 42 has a tubular support wall 52, which extends from the floor 44 in a direction which is axially away from the peripheral wall 46, the terminal face 53 of same engaging the seal means 24.

The control chamber 27 is located in the portion delimited by the support wall 52. In accordance with the respective position the terminal section of the valve spool 17 will plunge to a greater or lesser extent into the space delimited by the terminal wall 52.

The pot-shaped body 53 does not necessarily have to be a component of a supporting element of the type described. It can also be an independent or separate body as well.

The floor 44 constituting the abutment means 22 bridges over the entire axial distance "a" between the permanent magnet means 46 and the terminal face 23 of the valve spool 17 located in the associated terminal position.

The floor 44 and therefore the abutment means 22 consist of non-ferromagnetic material and preferably of synthetic resin. If it is a question of a pot-shaped body 43, the same will also advantageously consist entirely of such material. The same applies for any support element 42 present.

In order to ensure having the magnet attraction force the valve spool 17 will in the working example consist completely of ferromagnetic material, and preferably of non-permanently magnet material. However, it would also be possible to limit this choice of material to the terminal section of the valve spool adjacent to the permanent magnet means. For instance the terminal sections of the valve spool 17 could consist of a non-permanently magnetic material, whereas the remaining component would consist of plastic material, which is molded on the metallic terminal sections.

In the case of another design in accordance with the invention the valve spool as a whole will consist of non-ferromagnetic material, it being fitted at its terminal section remote from the permanent magnet means 38 with at least one ferromagnetic and preferably non-permanently magnetic member 54, is indicated in the drawing in chained lines. The material member 54 may for example be introduced as an insert in a valve spool 17 otherwise manufactured of plastic material or aluminum material.

In order to attain similar coefficients of thermal expansion the valve spool 17 and the seal means 24 should consist of the same material.

The permanent magnet means 38 is in the working example disk-like in form and is arranged coaxially to the valve spool 71 or, respectively, the valve spool socket 14. It may be composed of several components, for instance of a combination of permanently magnetic and non-permanently magnetic components. Preferably it is however manufactured as a single permanently magnetic component, as is the case with the working example.

A particularly simple duct design for the pilot control ducts 28 is one in which the respective pilot control duct 28 extends through the permanent magnet means 38 and preferably also through the abutment means 33 to open into the associated control chamber 27. In the working embodiment the two components have the pilot control duct 28 extending through them axially and preferably in the center. The permanent magnet means 38 can in this case be in the form of a centrally perforated permanent magnet disk.

In order to be substantially independent of manufacturing and assembly inaccuracies in the working example the permanent magnet means 38 is placed in the accommodating space 48 with a little axial play. It lies loosely in this accommodating station 48 with peripheral support by the peripheral wall 46 although in the axial direction there is some slight play for movement. The axial distance between the floor 44 and the terminal wall 16 is therefore slightly larger than the thickness of the permanent magnet means 38.

Accordingly it is possible to ensure that even in the case of unfavorable summated manufacturing inaccuracies no axial forces are transferred from the abutment means 22 to the permanent magnet means 38, when the valve spool 17 hits the abutment means 22.

The latching means in the present example offer the advantage that owing to them there is practically no wear on them as such and on the valve spool 17, something which substantially increases the working life of the pulse valve. The number of the component inaccuracies or tolerances, which might affect the magnetic latching force, are substantially reduced, something which simultaneously entails a substantial reduction in the control pressure minimally necessary for the actuation of the valve spool. The desired magnetic latching force may be set by way of the axial distance "a" set by the abutment means 22 so that valves with different magnetic forces may be designed for, even if the permanent magnet means is always the same.

During operation of the pulse valve the valve spool 17 may be shifted into the one or the other of the two terminal positions by appropriate activation of the pilot valve means 1. The respective terminal position is defined by the valve spool hitting the associated abutment means 22. After this the valve spool 17 stays in the terminal position reliably and kept by the permanent magnet means 38 independently of any mechanical loads on the pulse valve 12 until renewed activation of the pilot valve means 1 causes an opposite fluid setting force exceeding the magnetic force to act on the valve spool 17 so that same is shifted into the other terminal or end position, where equivalent circumstances come into play.

The invention claimed is:

1. A pilot controlled pulse valve, comprising a principal valve which is able to be fluid actuated by a pilot valve means and which possesses a valve spool able to be switched over between two terminal positions by pulsed fluid actuation in a valve spool socket defined in a valve housing, wherein holding means being associated to at least one axial terminal portion of the valve spool for releasable latching of the valve spool with regard to the valve housing when in a terminal position and not axially fluid-actuated, wherein the latching means include a permanent magnet means arranged in a fixed manner in relation to the housing and in an axial extension of the valve spool, said latching means being adapted to retain the valve spool, when same has assumed the associated terminal position, by magnetic force, the valve spool in this magnetically latched terminal position being arranged at an axial distance, not bridged over by ferromagnetic material, from the permanent magnet means, such distance being set by an abutment means, which is axially arranged between the permanent magnet means and the valve spool to cooperate with the adjacent end side of the valve spool, such abutment means being supported in relation to the housing in a manner independently of the permanent magnet means.

2. The pulse valve as set forth in claim 1, wherein the abutment means bridges over the entire axial distance between the permanent magnet means and the valve spool assuming the associated terminal position.

3. The pulse valve as set forth in claim 1, wherein the abutment means consists of non-ferromagnetic material.

4. The pulse valve as set forth in claim 3, wherein the abutment means consists of plastic material.

5. The pulse valve as set forth in claim 1, wherein at least the valve spool's terminal section adjacent to the permanent magnet means consists of ferromagnetic material.

6. The pulse valve as set forth in claim 5, wherein the entire valve spool consists of ferromagnetic material.

7. The pulse valve as set forth in claim 5, wherein the ferromagnetic material is a magnetically soft material.

8. The pulse valve as set forth in claim 1, wherein the valve spool consists of non-ferromagnetic material and at its terminal section adjacent to the permanent magnet means bears at least one member of ferromagnetic material.

9. The pulse valve as set forth in claim 8, wherein the at least one member of ferromagnetic material consists of a magnetically soft material.

10. The pulse valve as set forth in claim 1, wherein the permanent magnet means is shaped disk-like and is arranged coaxially to the valve spool.

11. The pulse valve as set forth in claim 10, wherein the permanent magnet means is consisting of a single permanently magnetic component.

12. The pulse valve as set forth in claim 1, wherein the abutment means is constituted by the floor of a pot-shaped body which is inserted into the valve spool socket in such a way that the opening of the pot-shaped body is turned axially away from the valve spool, said pot-shaped body with the terminal face of its peripheral wall being axially supported on the terminal wall of the valve spool socket, and the permanent magnet means being received in an accommodating space defined by the opening of the pot-shaped body between the pot-shaped body and the terminal wall of the valve spool socket.

13. The pulse valve as set forth in claim 12, wherein the pot-shaped body is an integral component of a support element inserted into the valve spool socket, such support element having a support wall, extending axially opposite to the peripheral wall of the pot-shaped body in a coaxial extension of the wall from the floor of the pot-shaped body, such support wall axially supporting a seal means coaxially surrounding the valve spool.

14. The pulse valve as set forth in claim 13, wherein the support element inserted into the valve spool socket is of sleeve-like design.

15. The pulse valve as set forth in claim 12, wherein the pot-shaped body consists of plastic material.

16. The pulse valve as set forth in claim 13, wherein the support element consists of plastic material.

17. The pulse valve as set forth in claim 1, wherein the permanent magnet means is arranged with axial play between the abutment means and the terminal wall of the valve spool socket.

18. The pulse valve as set forth in claim 1, wherein the section of the valve spool socket which is placed axially to the fore of the abutment means constitutes a control chamber subject to drive fluid under the control of the pilot valve means for driving the valve spool arranged in the valve spool socket.

19. The pulse valve as set forth in claim 18, wherein the control chamber communicates with at least one pilot control duct axially extending through the abutment means and the permanent magnet means.

20. The pulse valve as set forth in claim 19, wherein the at least one pilot control duct centrally extends through the abutment means and the permanent magnet means.

21. The pulse valve as set forth in claim 1, wherein the pilot valve means is combined with the principal valve so as to constitute a selfsupporting subassembly.

22. The pulse valve as set forth in claim 1, wherein the pilot valve means possesses an electrically operated pilot valve, respectively, for each direction of the switching of the valve spool.

23. The pulse valve as set forth in claim 22, wherein the electrically operated pilot valve is a solenoid valve.

24. The pulse valve as set forth in claim 1, wherein to both axial terminal portions of the valve spool there are associated latching means functioning on the basis of magnetic force.

\* \* \* \* \*